(12) United States Patent
Han et al.

(10) Patent No.: US 11,228,606 B2
(45) Date of Patent: Jan. 18, 2022

(54) GRAPH-BASED SENSOR RANKING

(71) Applicant: NEC Laboratories America, Inc., Princeton, NJ (US)

(72) Inventors: Shuchu Han, Princeton Junction, NJ (US); Wei Cheng, Princeton Junction, NJ (US); Dongjin Song, Princeton, NJ (US); Haifeng Chen, West Windsor, NJ (US); Yuncong Chen, Plainsboro, NJ (US)

(73) Assignee: NEC Corporation

( * ) Notice: Subject to any disclaimer, the term of this patent is extended or adjusted under 35 U.S.C. 154(b) by 281 days.

(21) Appl. No.: 16/590,514

(22) Filed: Oct. 2, 2019

(65) Prior Publication Data

US 2020/0112577 A1 Apr. 9, 2020

Related U.S. Application Data

(60) Provisional application No. 62/741,037, filed on Oct. 4, 2018.

(51) Int. Cl.
*H04L 29/06* (2006.01)
*G06F 16/2457* (2019.01)
*G06F 21/55* (2013.01)

(52) U.S. Cl.
CPC .... *H04L 63/1425* (2013.01); *G06F 16/24578* (2019.01); *G06F 21/552* (2013.01); *G06F 21/554* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,697,355 B1 * | 7/2017 | Park | G06F 21/552 |
| 2016/0330225 A1 * | 11/2016 | Kroyzer | G06F 21/552 |
| 2018/0013776 A1 * | 1/2018 | Gay | G06N 3/126 |
| 2018/0219889 A1 * | 8/2018 | Oliner | G06N 3/04 |
| 2018/0268264 A1 * | 9/2018 | Marwah | G06K 9/623 |
| 2019/0312898 A1 * | 10/2019 | Verma | G06N 3/084 |
| 2019/0342308 A1 * | 11/2019 | Chai | G06F 21/554 |

* cited by examiner

*Primary Examiner* — Joseph P Hirl
*Assistant Examiner* — Hassan Saadoun
(74) *Attorney, Agent, or Firm* — Joseph Kolodka

(57) ABSTRACT

Methods and systems for detecting and correcting anomalies include ranking sensors in a cyber-physical system according to a degree of influence each sensor has on a measured performance indicator in the cyber-physical system. An anomaly is detected in the cyber-physical system based on the measured performance indicator. A corrective action is performed responsive to the detected anomaly, prioritized according to sensor rank.

18 Claims, 4 Drawing Sheets

GRAPH-BASED SENSOR RANKING

RELATED APPLICATION INFORMATION

This application claims priority to U.S. Provisional Patent Application No. 62/741,037, filed on Oct. 4, 2018, incorporated herein by reference herein its entirety.

BACKGROUND

Technical Field

The present invention relates to multivariate time series analysis in physical systems and, more particularly, to ranking the outputs of sensors for use in maintenance and quality control.

Description of the Related Art

Large-scale physical systems can include a large number of sensors that observe real-time measurements of the status of the system. The sensor measurements may correlate with some performance indicator, such as the quality of a particular output sample, but it is difficult to determine how strongly each sensor influences the performance indicator. The large number of different inputs, and the low dimensionality of the output, make it difficult to determine how each sensor contributes.

SUMMARY

A method for detecting and correcting anomalies includes ranking sensors in a cyber-physical system according to a degree of influence each sensor has on a measured performance indicator in the cyber-physical system. An anomaly is detected in the cyber-physical system based on the measured performance indicator. A corrective action is performed responsive to the detected anomaly, prioritized according to sensor rank.

A system for detecting and correcting anomalies includes a sensor ranking module configured to rank sensors in a cyber-physical system, using a hardware processor, according to a degree of influence each sensor has on a measured performance indicator in the cyber-physical system. An anomaly detector is configured to detect an anomaly in the cyber-physical system based on the measured performance indicator. A control module is configured to perform a corrective action responsive to the detected anomaly, prioritized according to sensor rank.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided that analyze large-scale, multivariate time-series data from a cyber-physical system to provide a rank-ordered list of sensors monitoring the cyber-physical system that reflects how much each of the sensors influences a measured key performance indicator (KPI). Toward this end, the sensor outputs are broken up into time segments, with each time segment being associated with a respective KPI measurement. A label graph and a set of feature graphs are determined for each time segment and are used to determine a ranking of the sensors.

During operation of the cyber-physical system, the KPI is monitored for changes. When the KPI indicates a problem in the cyber-physical system, the ranked list of the sensors is used to prioritize maintenance, with more highly ranked sensors being checked first. In this manner, the present embodiments improve operation of the cyber-physical system.

Figure 1:
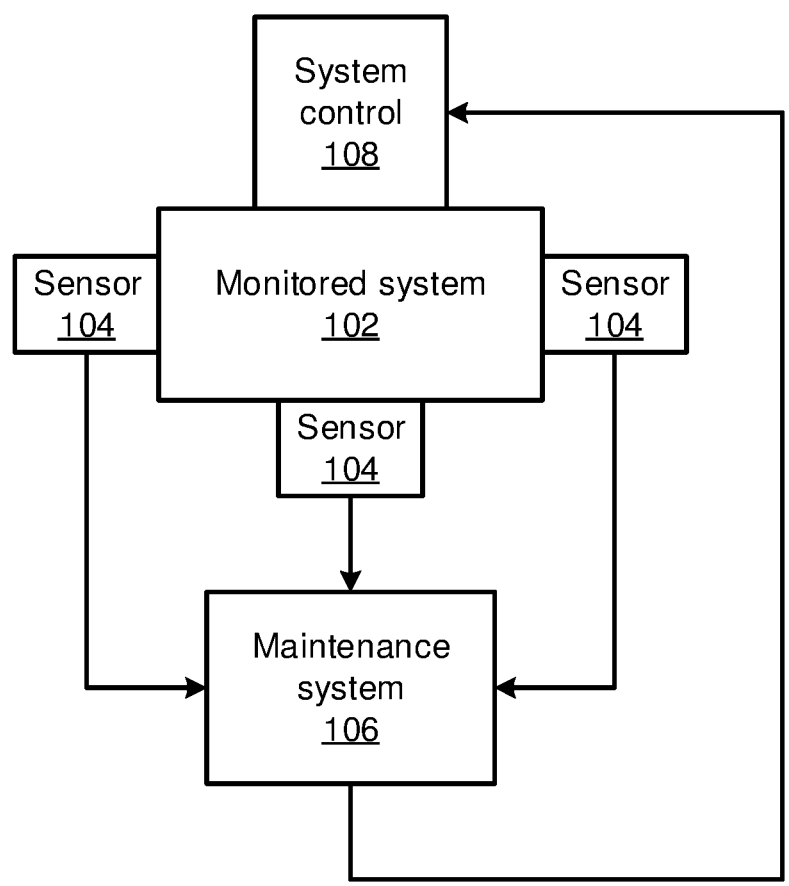
FIG. 1 is a block/diagram of a cyber-physical system with automated monitoring and maintenance in accordance with an embodiment of the present invention.

Referring now in detail to the figures in which like numerals represent the same or similar elements and initially to FIG. 1, a maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

In particular embodiments, the sensor data 104 can also include a KPI measurement. In some embodiments, the KPI measurement may be the result of an inspection of a physical output of the monitored system 102, or can represent a determination of a quality of the physical output by any appropriate measurement or characteristic.

The sensors 104 may transmit the logged sensor information to an anomaly maintenance system 106 by any appropriate communications medium and protocol, including wireless and wired communications. The maintenance system 106 can, for example, identify abnormal behavior by monitoring the KPI. Once anomalous behavior has been detected, the maintenance system 106 communicates with a system control unit 108 to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By prioritizing the sensors 104 according to their influence on the monitored KPI, the maintenance system 106 improves the response time to correct anomalous behavior.

Figure 2:
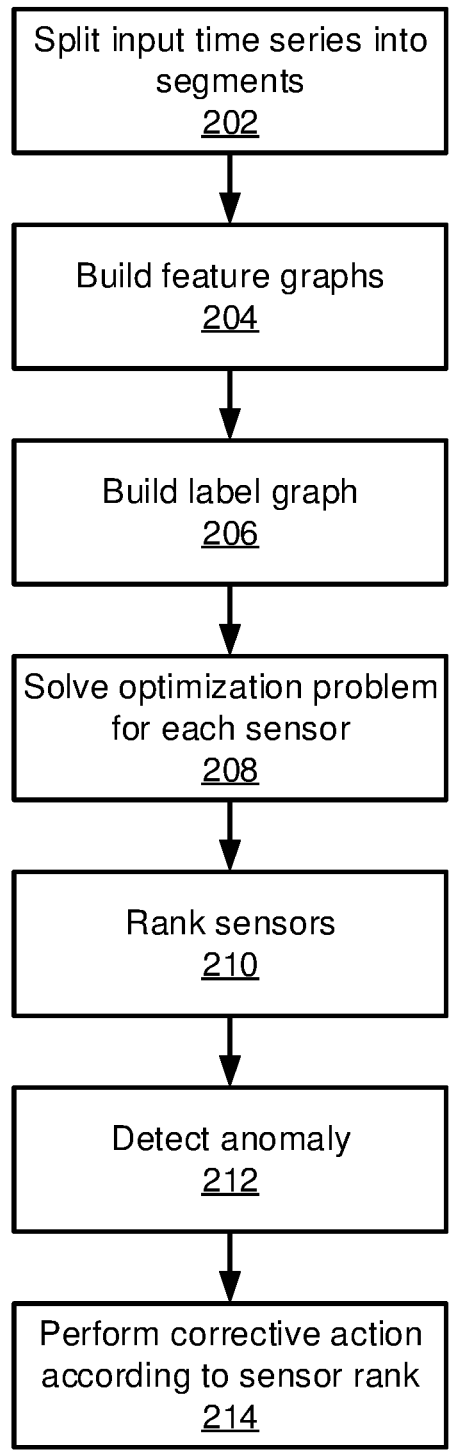
FIG. 2 is a block/flow diagram of a method for ranking sensors according to their influence on a key performance indicator and for correcting anomalies by performing corrective actions on the sensors in rank order in accordance with an embodiment of the present invention.

Referring now to FIG. 2, a method of performing rank-based maintenance is shown. Block 202 splits input time series into segments. The time segments can be defined by any appropriate duration, for example selecting the data output by each respective sensor 104 into time segments one day long in duration. Each time segment is also associated with a respective KPI measured during, or at the end of, that time segment. The input is thus expressed as $\{(X_1, y_1), \ldots, (X_i, y_i), \ldots, (X_n, y_n)\}$, where $X_i$ is a multivariate time series segment and $y_i$ is the corresponding KPI, with a total of n time segments being determined. Thus, each time series segment $X_i$ will include one or more samples of each of the sensors 104 taken during course of the time period i. If there are m sensors, then $X_1$ will include m time series $x_i^m$.

In some embodiments, the time series can be expressed as continuous real values with a fixed sampling rate, measured over a period of time. In some embodiments, the KPI label can be assumed to be binary, having possible values of zero and one. Thus, if a product output is tested and fails its inspection in some way, the KPI label for that time segment may be a zero, whereas the KPI label for a time segment where the product output passes inspection may be a one.

Block 204 builds feature graphs from the multivariate time series segments. In particular, for each segment, block 204 builds a set of m distinct graphs, one for each respective sensor 104. The label graphs are thus expressed as $G_k^x$, with k representing a particular sensor index. The details of feature graph formation will be described in more detail below. Block 206 builds a label graph for each time segment. The graph labels are expressed as $G^y$. The details of label graph formation will be described in more detail below.

Block 208 solves an optimization problem for each respective sensor. In particular, the optimization problem is expressed as the objective function:

$$\mathcal{L}(G_k^x, G^y) = \frac{1}{2}\left\|G^y - \sum_{i=1}^m a_i G_k^x\right\|_2^2 + \beta|a_k|_1$$

where $a_k$ is a coefficient for each feature graph that is used to rank the importance of each sensor and $\beta$ is a user-specified parameter, and k is an index of each time series in the multivariate time series, for example representing a particular sensor index. In this objective function. The objective function provides a linear combination of feature graphs, with $\Sigma_{i=1}^m a_i G_i^x$ approximating the label graph $G^y$. By minimizing the objective function, the values of $a_k$ are determined to create respective ranks for the sensors 104.

Block 210 then uses the rank values $a_k$ to create a rank-ordered list of the sensors 104. These ranks indicate how much influence each sensor 104 has on the measured KPI for each time segment. In some embodiments, the absolute value of the rank coefficients $a_k$ can be used to determine the rank, with the absolute value indicating the contribution of each feature graph to the label graph in the approximation process.

Block 212 detects an anomaly. For example, if the KPI for a current or previous time segment is measured to be a zero, indicating that the product failed inspection, block 212 indicates that an anomaly has occurred. Block 214 then performs a corrective action. The corrective action prioritizes sensors according to the ranked list, first addressing those systems that are most closely associated with the KPI.

Figure 3:
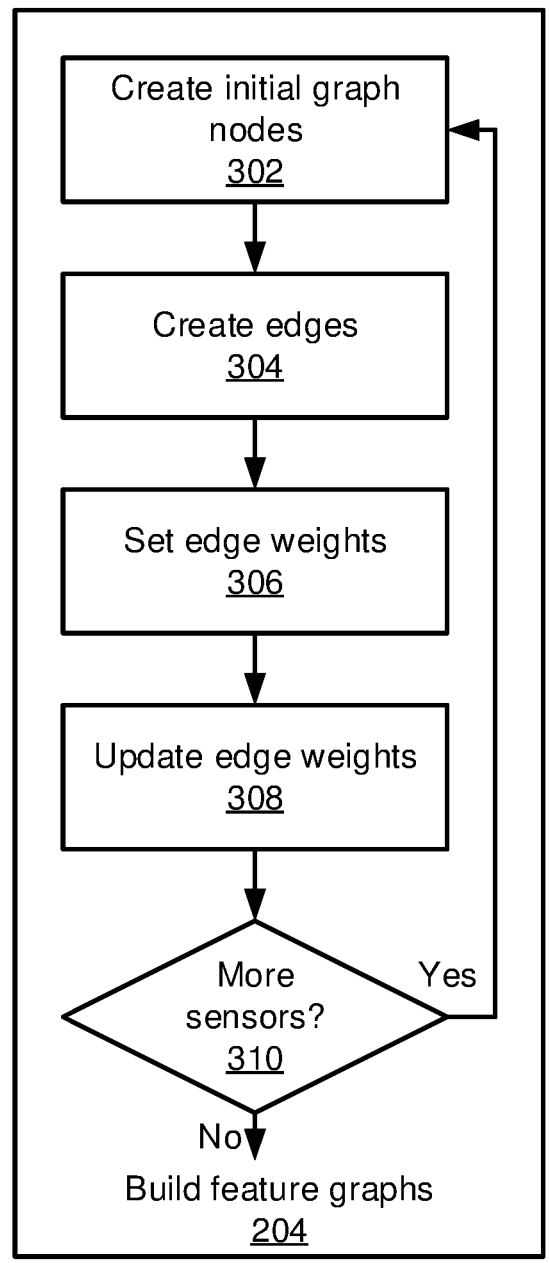
FIG. 3 is a block/flow diagram of a method for building feature graphs that represent sensors in a cyber-physical system in accordance with an embodiment of the present invention.

Referring now to FIG. 3, additional detail on building feature graphs in block 204 is shown. Block 302 creates n nodes for a particular sensor, where n is the number of time segments. Block 304 creates edges between the nodes to create a fully connected graph, with each node being connected to every other node. Block 306 then assigns a weight W(i,j) for the edge between each pair of nodes i and j.

The edge weight W(i,j) is initialized according to a dynamic time warping distance between corresponding time series at segment $X_i$ and $X_j$. Dynamic time warping is a measurement of similarity between two sequences, such that time segments from a given sensor 104 that are similar to one another will have a higher weight than time segments from the sensor 104 that are dissimilar to one another. Block 308 then updates the weights according to $G_k^x(i,j)=e^{-\lambda W(i,j)}$, where $\lambda$ is a user-selected parameter. The weight update changes the graph from a distance graph to a similarity graph to normalize edge weight values to the range [0.0, 1.0]. For a good value of $\lambda$, a median value of the distance graph W(i,j) can be used. Thus, the value of $\lambda$ can be set as $$\lambda = \frac{1}{2\text{median\_dist}(W(i,j))}$$

This completes the graph $G_k^x$ for the particular sensor k. Block 310 determines whether there are more sensors 104 that do not yet have a graph. If so, processing returns to block 302 and the next sensor is selected from the sensors 104. If not, processing ends and the feature graphs are output.

Figure 4:
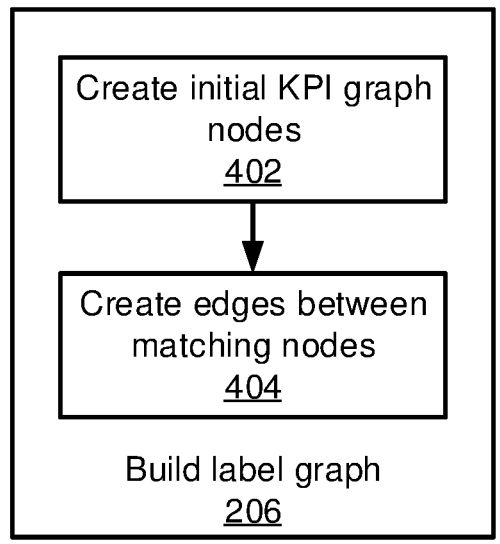
FIG. 4 is a block/flow diagram of a method for building label graphs for sensors in a cyber-physical system in accordance with an embodiment of the present invention.

Referring now to FIG. 4, additional detail on building label graphs in block 206 is shown. Block 402 creates nodes for a KPI graph, with each KPI measurement (e.g., a respective KPI measurement for each time segment) being associated with a respective node. For each node pair (i, j), block 404 creates an edge if, and only if, the associated KPI measurements are the same. Thus, when binary KPI measurements are used, two fully connected sub-graphs can be formed, with one sub-graph having those nodes with a KPI value of one, and the other sub-graph having those nodes with a KPI value of zero. The edges are created with a default weight value, such as "one."

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
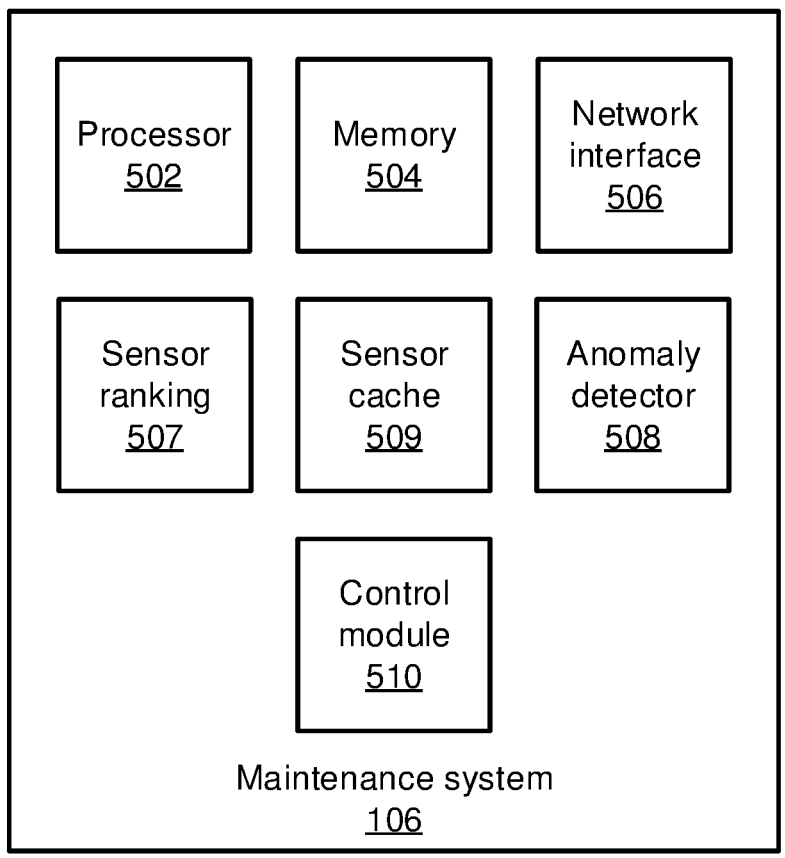
FIG. 5 is a block diagram of a maintenance system that monitors and maintains a cyber-physical system in accordance with an embodiment of the present invention.

Referring now to FIG. 5, additional detail on the maintenance system 106 is shown. The maintenance 106 includes a hardware processor and a memory 504. A network interface 506 communicates with the sensors 104 and the system control 108 by any appropriate wired or wireless communications medium and using any appropriate protocol.

A sensor ranking 507 is determined by the processor 502 and is stored in the memory 504. The sensor ranking 507 identifies particular sensors 104 according to the relative strengths of their influence on the KPI measured from the monitored system 102.

Anomaly detector 508 assesses the measured KPIs for current or recent time segments and determines whether the measured KPIs indicate an anomaly. In some examples, a single negative KPI (e.g., a single failed product in an inspection) is sufficient to trigger the anomaly detector 508. In other embodiments, a threshold number of consecutive negative KPIs or a percentage of failed KPIs out of a previous number of KPIs can be sufficient to trigger the anomaly detector 508. The control module 510 automatically responds to the flagged anomalies by triggering a corrective action using the network interface 506. The corrective action can include diagnostics designed to acquire more information regarding the anomaly from the sensors 104. For example, the sensors 104 can be polled in ranked order to obtain diagnostic information. In other embodiments, corrective actions can include changing a setting or state of devices associated with the respective sensors 104. In such embodiments, the corrective action can prioritize ranks that have a greater degree of influence over the KPI.

In some embodiments, a separate memory can be used to implement sensor cache 509. The sensor cache 509 stores a local copy of the recorded time series from the sensors 104. The use of the cache server 509 helps accelerate the ranking process by decreasing the amount of time needed to access time series data information.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalies, comprising:

ranking sensors in a cyber-physical system, using a hardware processor, according to a degree of influence each sensor has on a measured performance indicator in the cyber-physical system;

detecting an anomaly in the cyber-physical system based on the measured performance indicator; and performing a corrective action responsive to the detected anomaly, prioritized according to sensor rank.

2. The method of claim 1, further comprising recording time series data for each sensor in the cyber-physical system and dividing each time series into time segments.

3. The method of claim 2, wherein ranking the sensors comprises determining respective feature graphs for each time segment of each sensor's time series data.

4. The method of claim 3, wherein determining the feature graphs comprises weighting edges in the feature graphs according to a dynamic time warping distance between pairs of time segments.

5. The method of claim 3, wherein ranking the sensors further comprises determining a single label graph for measurements of the performance indicator at each time segment.

6. The method of claim 5, wherein ranking the sensors further comprises minimizing a loss function based on the feature graphs and the label graph to determine a set of ranking coefficients that rank the sensors according to the degree of influence each sensor has on the measured performance indicator.

7. The method of claim 6, wherein the loss function is:

$$\mathcal{L}(G_k^x, G^y) = \frac{1}{2}\left\|G^y - \sum_{i=1}^{m} a_i G_i^x\right\|_2^2 + \beta|a_k|_1$$

where $G_k^x$ is a feature graph for the $k^{th}$ sensor, $G^y$ is the label graph, m is a number of sensors, $a_k$ is a ranking coefficient corresponding to the $k^{th}$ sensor, and $\beta$ is a user-specified parameter.

8. The method of claim 7, wherein minimizing the loss function determines a set of values $a_k$ that minimize a difference between the label graph $G^y$ and an approximation of the label graph at a particular sensor i, $a_i G_i^x$.

9. The method of claim 1, wherein performing the corrective action includes performing an action selected from the group consisting of changing a security setting for an application or hardware component, changing an operational parameter of an application or hardware component, halting and/or restarting an application, halting and/or rebooting a hardware component, changing an environmental condition, and changing a network interface's status or settings.

10. A system for detecting and correcting anomalies, comprising:

a sensor ranking module configured to rank sensors in a cyber-physical system, using a hardware processor, according to a degree of influence each sensor has on a measured performance indicator in the cyber-physical system;

an anomaly detector configured to detect an anomaly in the cyber-physical system based on the measured performance indicator; and a control module configured to perform a corrective action responsive to the detected anomaly, prioritized according to sensor rank.

11. The system of claim 10, wherein the sensor ranking module is further configured to record time series data for each sensor in the cyber-physical system and dividing each time series into time segments.

12. The system of claim 11, wherein the sensor ranking module is further configured to determine respective feature graphs for each time segment of each sensor's time series data.

13. The system of claim 12, wherein the sensor ranking module is further configured to weight edges in the feature graphs according to a dynamic time warping distance between pairs of time segments.

14. The system of claim 13, wherein the sensor ranking module is further configured to determine a single label graph for measurements of the performance indicator at each time segment.

15. The system of claim 14, wherein the sensor ranking module is further configured to minimize a loss function based on the feature graphs and the label graph to determine a set of ranking coefficients that rank the sensors according to the degree of influence each sensor has on the measured performance indicator.

16. The system of claim 15, wherein the loss function is:

$$\mathcal{L}(G_k^x, G^y) = \frac{1}{2}\left\|G^y - \sum_{i=1}^{m} a_i G_i^x\right\|_2^2 + \beta|a_k|_1$$

where $G_k^x$ is a feature graph for the $k^{th}$ sensor, $G^y$ is the label graph, m is a number of sensors, $a_k$ is a ranking coefficient corresponding to the $k^{th}$ sensor, and $\beta$ is a user-specified parameter.

17. The system of claim 16, wherein minimizing the loss function determines a set of values $a_k$ that minimize a difference between the label graph $G^y$ and an approximation of the label graph at a particular sensor i, $a_i G_i^x$.

18. The system of claim 10, wherein the control module is further configured to perform a corrective action selected from the group consisting of changing a security setting for an application or hardware component, changing an operational parameter of an application or hardware component, halting and/or restarting an application, halting and/or rebooting a hardware component, changing an environmental condition, and changing a network interface's status or settings.

* * * * *